United States Patent
Luffel et al.

(10) Patent No.: US 7,451,461 B1
(45) Date of Patent: *Nov. 11, 2008

(54) LATERALLY EXPANDABLE MODULAR DATA STORAGE SYSTEM

(75) Inventors: Robert W Luffel, Greeley, CO (US); David P Jones, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/371,708

(22) Filed: Aug. 9, 1999

Related U.S. Application Data

(63) Continuation-in-part of application No. 09/337,802, filed on Jun. 22, 1999, now Pat. No. 7,027,367.

(51) Int. Cl.
*G11B 17/03* (2006.01)
*G11B 15/68* (2006.01)

(52) U.S. Cl. ..................... 720/600; 360/92.1
(58) Field of Classification Search ............... 369/178, 369/38, 34, 35, 36; 360/92; 414/807, 281
See application file for complete search history.

(56) References Cited

U.S. PATENT DOCUMENTS

| | | | |
|---|---|---|---|
| 4,998,232 A | 3/1991 | Methlie et al. | 369/36 |
| 5,010,536 A | 4/1991 | Wanger et al. | 369/36 |
| 5,014,255 A | 5/1991 | Wanger et al. | 369/36 |
| 5,015,139 A * | 5/1991 | Baur | 414/281 |
| 5,043,962 A | 8/1991 | Wanger et al. | 369/36 |
| 5,497,057 A | 3/1996 | Danielson et al. | |
| 5,870,245 A | 2/1999 | Kersey et al. | |
| 6,166,877 A * | 12/2000 | Tadokoro et al. | 360/92 |

FOREIGN PATENT DOCUMENTS

| EP | 0542482 | 5/1993 |
|---|---|---|
| EP | 0542482 A2 | 5/1993 |
| EP | 0685842 A2 | 12/1995 |
| EP | 0982723 | 3/2000 |
| EP | 0982723 A2 | 3/2000 |

* cited by examiner

*Primary Examiner*—David D Davis

(57) ABSTRACT

A modular data storage system for handling and storing data cartridges comprises a cartridge access device and at least two laterally adjacent modular units. Each of the modular units may comprise a plurality of cartridge receiving devices and a plurality of elongate gear racks aligned along a displacement path. The elongate gear racks are substantially in alignment with one another such that the cartridge access device may be translated among the laterally adjacent modular units. The system further comprises a translation apparatus for moving a cartridge access device along a displacement path. The translation apparatus may comprise a plurality of drive pinions mounted to the cartridge access device and engaging the plurality of elongate gear racks, and a pinion drive apparatus operatively associated with the drive pinions. The pinion drive apparatus rotates the drive pinions to move the cartridge access device among the elongate gear racks of the adjacent modular units. The adjacent modular units may be comprised of a master modular unit and at least one slave modular unit. The master modular unit further comprises a power supply and may also comprise a control system operatively associated with the pinion drive apparatus, and each slave modular unit may be electrically connected to the power supply in the master modular unit.

17 Claims, 5 Drawing Sheets

LATERALLY EXPANDABLE MODULAR DATA STORAGE SYSTEM

The present application is a continuation-in-part of U.S. patent application Ser. No. 09/337,802 filed Jun. 22, 1999 now U.S. Pat. No. 7,027,367, for APPARATUS FOR TRANSLATING A CARTRIDGE ACCESS DEVICE of Robert W. Luffel et al., which is hereby specifically incorporated by reference for all that is disclosed therein.

FIELD OF THE INVENTION

The present invention relates generally to systems for handling and storing data storage media devices such as data cartridges, and more specifically to a data storage system comprised of laterally adjacent modular units.

BACKGROUND OF THE INVENTION

Data storage in the computer industry is accomplished in a number of ways. For example, data may be stored on tape, compact disk, "floppy" or "hard" disk, and the like. Oftentimes, data storage media which is transferrable from one location to another is housed within a parallelepiped-shaped cartridge. It is to be understood that the term "cartridge" or "data cartridge" as used in the present application encompasses any data storage media device, whether or not it is housed within a cartridge.

Data storage systems are used to store data storage media devices such as data cartridges at known locations and to retrieve desired cartridges so that data may be written to or read from the cartridges. Such data storage and handling systems are often referred to as "juke box" data storage systems, particularly if they can accommodate a large number of individual data cartridges.

A typical data storage system may include different types of cartridge receiving devices. For example, one type of cartridge receiving device is a cartridge storage rack or "magazine" which has a plurality of individual cartridge storage locations that may be arranged in one or more horizontal rows or arrays. Another type of cartridge receiving device is a cartridge read/write device or "drive".

A data storage system may also include a cartridge access device. Depending on the particular system, the cartridge access device may comprise a cartridge engaging assembly or "picker" which may be adapted to engage the selected data cartridge, withdraw it from its storage location, and carry it to a drive. The drive may then be used to read data from or write data to the cartridge. Once the read/write operation is complete, the cartridge engaging assembly or picker may withdraw the data cartridge from the drive and return it to the appropriate location within the cartridge storage array. In another type of system, the cartridge access device may comprise the drive itself, in which case the data cartridge may be read from or written to without the need to carry the data cartridge to a separate drive.

Regardless of the particular type of cartridge access device that is utilized by the data storage system, the positioning system or translation apparatus used to move the cartridge access device along the cartridge storage array must be capable of moving the cartridge access device along the cartridges stored in the array so that the desired data cartridge may be accessed. One type of positioning system, often referred to as a "lead-screw" system, mounts the cartridge access device on a lead-screw which, when turned, moves the cartridge access device back and forth along the array of cartridges. While such lead-screw positioning systems are being used, they are not without their problems. For example, in such a system the cartridge access device may be cantilevered on the lead-screw which may result in excessive transverse or rotational movement of the cartridge access device. Such excessive movement reduces positional accuracy and may make it difficult for the cartridge access device to reliably engage the desired data cartridge on a repeated basis.

Partly in an effort to solved the foregoing problems, positioning systems have been developed which utilize separate guide rails or tracks to guide the cartridge access device along the array of cartridges. The cartridge access device is mounted to the separate guide rails or tracks and the lead-screw is then used only to move the cartridge access device to the desired location. Alternatively, a wire-rope (i.e., cable) drive system may be used to move the cartridge access device. While such systems generally provide for increased positional accuracy over a simple cantilevered type of lead-screw arrangement, they are still not without their disadvantages. For example, the guide rail or track assemblies usually comprise machined components finished to a high degree of precision, which adds to the overall cost of the data storage system. Moreover, the guide rail or track assemblies are often difficult to align and may become mis-aligned during subsequent shipping or movement of the data storage system. If the mis-alignment is substantial, it may be necessary to re-align and re-calibrate the positioning system before the data storage system can be placed in operation.

A positioning system/translation apparatus for moving a cartridge access device along an array of cartridges has been described in the parent application Ser. No. 09/337,802 (hereinafter referred to as '802). This positioning system provides increased positional accuracy to reduce errors due to mis-alignment of the cartridge access device. As described in '802, this is achieved with a minimum number of components to maximize reliability and reduce cost, yet does not require the use of expensive, precision-machined components and guide rails. The positioning system of '802 also reduces the amount of time required to align and calibrate the assembly during production and reduces the likelihood of subsequent mis-alignment due to shipping or rough handling. The positioning system of '802 requires less space than prior art positioning systems, thereby allowing for a reduction in the overall size of the data storage system or allowing for an increased number of data cartridges to be stored within the system.

Regardless of the positioning system used, juke box data storage systems may be produced in a variety of sizes and configurations. In order to establish a product definition, a data storage system manufacturer may survey potential customers as to their specific needs. The manufacturer may then design a "point" product around this definition. This process may be repeated for different types of customers which are typically classified as "low-end", "mid-range" or "high-end" customers ("low-end" customers requiring a more cost-competitive, smaller capacity library than "mid-range" or "high-end" customers). The result may be a series of products not only of different sizes and capacities, but also having unique housings, assemblies, and individual components.

Furthermore, the capacity of each of these products is limited, i.e., within any particular data storage system produced by a manufacturer there is a specific number of cartridge storage locations and drives. This limits the options for a customer whose needs change and who may require a larger data storage system at some point in the future. More particularly, that customer can either purchase another data storage system to use along with their original data storage system, or that customer can purchase a new, larger-capacity data storage system to replace the original one. While the former option involves less initial cost than the latter, there are several disadvantages for the customer to utilize multiple data storage systems rather than purchase a single, larger system. Specifically, each data storage system has its own cartridge access device, data storage racks and drives. There is an unnecessary duplication of components such as the cartridge access device: i.e., the customer needing an upgrade requires more data storage racks and possibly more drives, but not an extra cartridge access device. Furthermore, the magazines and drives from the first data storage system are not accessible by the cartridge access device of the second data storage system, and vice-versa.

Thus, a need exists for a data storage system which is comprised of individual modular units that can be combined to form data storage systems of varying size and capacity. Ideally, this modular data storage system would utilize the laterally expandable positioning system of '802 which is adapted to laterally translate a cartridge access device among all of the modular units.

The modular units would preferably be comprised of interchangeable housings, assemblies and individual components. This would allow the entire family of data storage systems, including systems for low-end, mid-range, and high-end customers, to be designed and manufactured together. This replication of components would provide many advantages to both the manufacturer and the customer, since a single set of components could be used to supply an entire family of data storage systems. To further avoid duplication of components, a power supply would most preferably be housed within a "master" modular unit which is electrically connectable to any "slave" modular units which require electrical power for drives or other electrically-powered components. The "master" modular unit could also be used to house various ancillary devices which need not be duplicated in the slave modular units, such as, for example, a control system which controls the positioning system.

SUMMARY OF THE INVENTION

A modular data storage system for handling and storing data cartridges comprises a cartridge access device and at least two laterally adjacent modular units. Each of the modular units may comprise a plurality of cartridge receiving devices and a plurality of elongate gear racks aligned along a displacement path. The elongate gear racks are substantially in alignment with one another such that the cartridge access device may be translated among the laterally adjacent modular units. The system further comprises a translation apparatus for moving a cartridge access device along a displacement path. The translation apparatus may comprise a plurality of drive pinions mounted to the cartridge access device and engaging the plurality of elongate gear racks, and a pinion drive apparatus operatively associated with the drive pinions. The pinion drive apparatus rotates the drive pinions to move the cartridge access device among the elongate gear racks of the adjacent modular units. The adjacent modular units may be comprised of a master modular unit and at least one slave modular unit. The master modular unit further comprises a power supply and may also comprise a control system operatively associated with the pinion drive apparatus, and each slave modular unit may be electrically connected to the power supply in the master modular unit.

BRIEF DESCRIPTION OF THE DRAWINGS

Illustrative and presently preferred embodiments of the invention are shown in the accompanying drawings in which.

DETAILED DESCRIPTION OF THE INVENTION

A laterally expandable modular data storage system according to the present invention is shown and will be described in further detail below with reference to FIGS. 4 and 5. A translation apparatus (positioning system) 10 for moving a cartridge access device 12 of a modular data storage system along a displacement path 14 will first be described.

Figure 1:
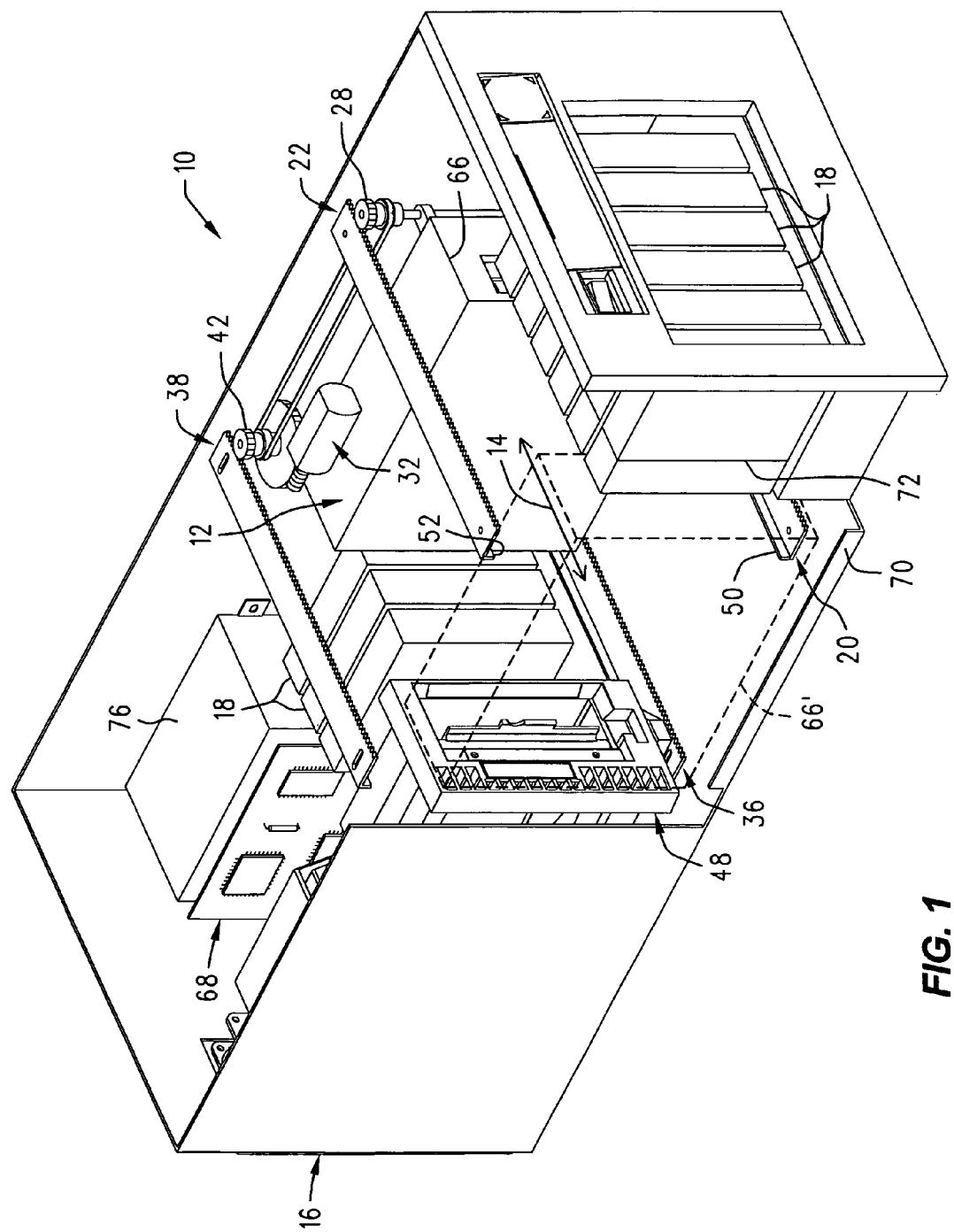
FIG. 1 is a perspective view of the translation apparatus utilized in a modular unit of the present invention.
Figure 2:
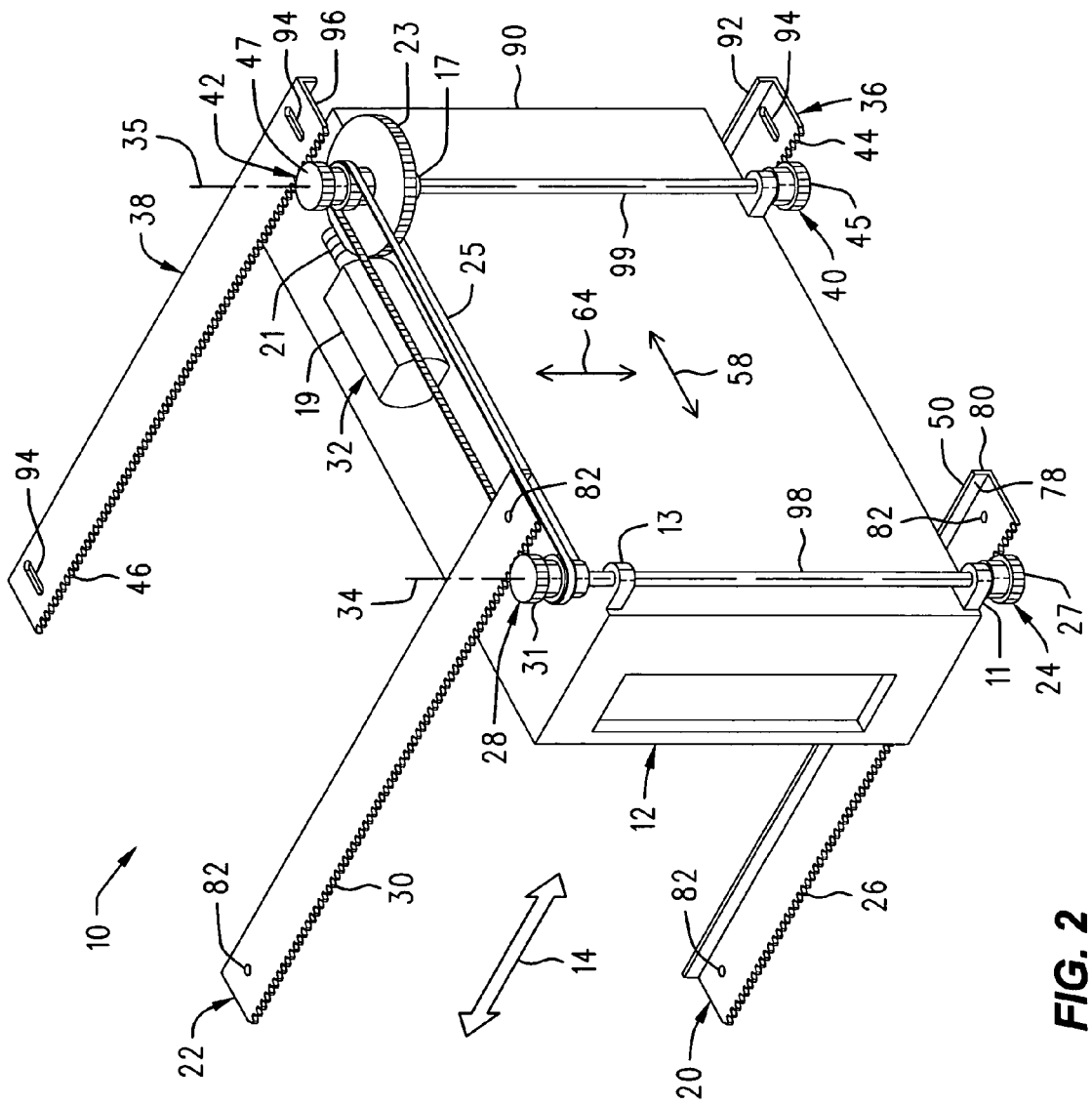
FIG. 2 is a perspective view of the translation apparatus of FIG. 1.

With reference to FIGS. 1 and 2, the translation apparatus 10 may comprise a first or lower elongate gear rack 20 positioned so that it is generally aligned with the displacement path 14. A second or upper elongate gear rack 22 is positioned in generally spaced-apart relation to the first or lower elongate gear rack 20 so that the second or upper elongate gear rack 22 also extends generally along the displacement path 14. A first or lower drive pinion 24 mounted to the cartridge access device 12 is sized and positioned to engage the teeth 26 provided on the first or lower gear rack 20, as best seen in FIG. 2. A second or upper drive pinion 28 may also be mounted to the cartridge access device 12 so that the second or upper drive pinion 28 engages the teeth 30 provided on the second or upper gear rack 22. A pinion drive apparatus 32 operatively associated with the lower and upper drive pinions 24 and 28 rotates the drive pinions 24 and 28 about drive pinion axis 34, thereby moving the cartridge access device 12 along the displacement path 14. The pinion drive apparatus 32 may be connected via cables (not shown) or the like (e.g., flat ribbon cables well-known in the art) to a power supply 76 and a pinion drive apparatus control system 68, which will be discussed in further detail below.

The translation apparatus 10 may be provided with third and fourth elongate gear racks 36 and 38 positioned in generally spaced-apart relation to the first and second elongate gear racks 20 and 22, in the manner best seen in FIG. 2. The first, second, third, and fourth elongate gear racks 20, 22, 36, 38 define a generally rectangular, parallelepiped configuration, with the first and third elongate gear racks 20, 36 defining a bottom side of the generally rectangular, parallelepiped configuration and the second and fourth elongate gear racks 22, 38 defining a top side of the generally rectangular, parallelepiped configuration. If such third and fourth elongate gear racks 36 and 38 are provided, the cartridge access device 12 may also be provided with third and fourth drive pinions 40 and 42 sized to engage teeth 44 and 46 provided on respective gear racks 36 and 38.

Figure 3:
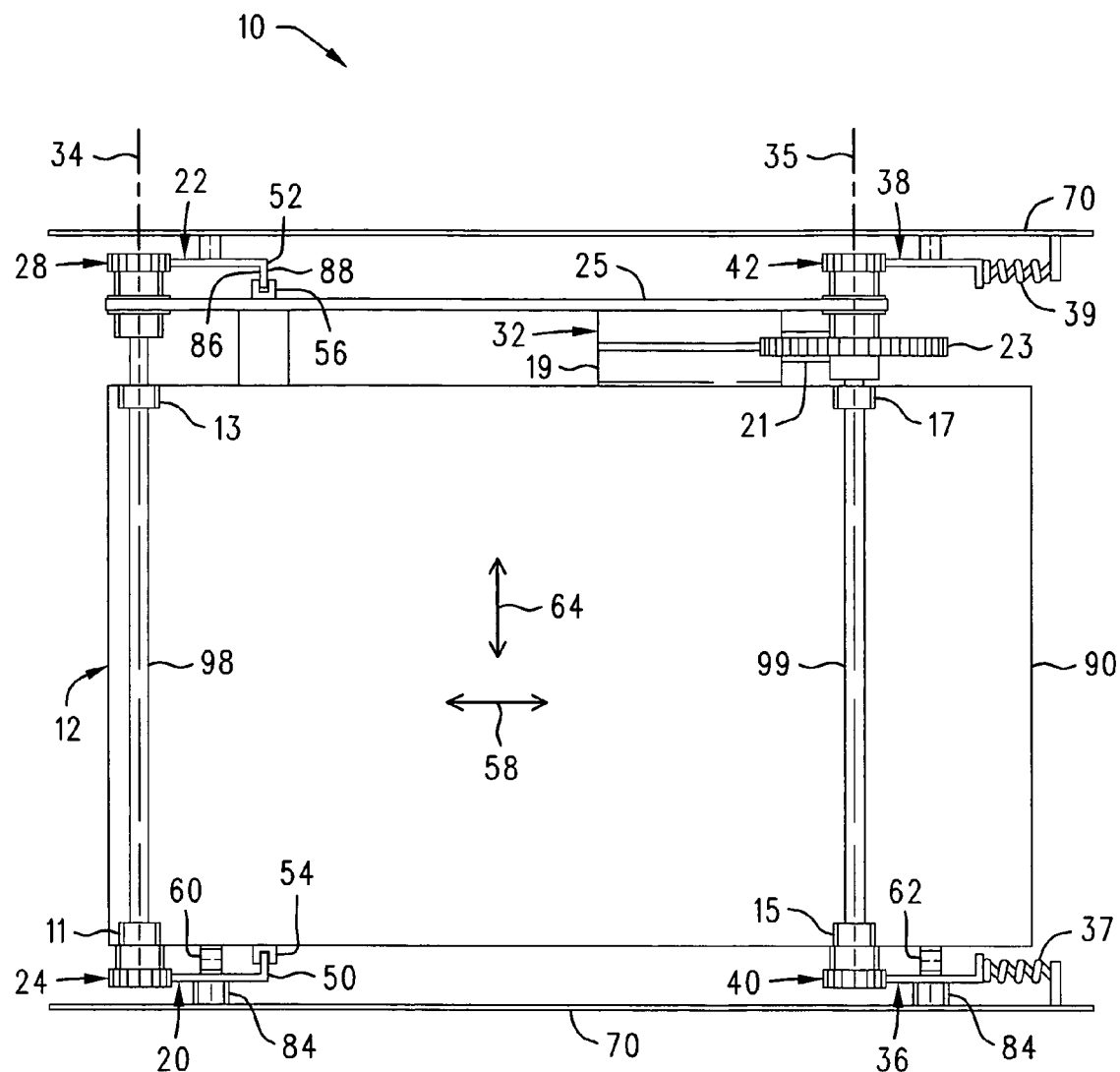
FIG. 3 is a side elevation view of the translation apparatus of FIG. 1.

Besides allowing the cartridge access device 12 to be moved back and forth along the displacement path 14, certain of the various elongate gear racks (e.g., 20, 22, 36, and 38) guide and support the cartridge access device 12 to allow the same to be accurately positioned adjacent the selected cartridge receiving device (e.g., a cartridge read/write device 48 or a cartridge storage array 72, as the case may be). With reference now primarily to FIG. 3, the lower and upper elongate gear racks 20 and 22 may be provided with respective elongate guide members or portions 50 and 52 that extend generally along the displacement path 14 (FIG. 2). The cartridge access device 12 may be provided with first and second bearing members 54 and 56 sized to engage the first and second guide members or portions 50 and 52, respectively. The cooperative engagement of the first and second bearing members 54 and 56 with the respective first and second guide members 50 and 52 guides or controls the position of the cartridge access device 12 in the transverse or lateral direction 58 while at the same time allowing the cartridge access device 12 to move back and forth freely along the displacement path 14.

The cartridge access device 12 may also be provided with a pair of rollers or wheels 60 and 62 which roll along the first and third elongate gear racks 20 and 36, respectively. The engagement of the rollers or wheels 60 and 62 with the first and third elongate gear racks 20 and 36 guides or controls the position of the cartridge access device 12 in the vertical direction 64.

The translation apparatus 10 may be operated as follows to move the cartridge access device 12 back and forth along the displacement path 14 to position the cartridge access device 12 adjacent the appropriate cartridge receiving device location (e.g., the cartridge read/write device 48 or the cartridge storage array 72), that may be provided in the data storage system 16. With reference now to FIGS. 1 and 2, consider, for example, a hypothetical situation wherein it is desired to move the cartridge access device 12 from an initial or first position 66 adjacent a cartridge storage location provided in the cartridge storage array 72 to a second position 66' adjacent the cartridge read/write device 46. As a first step in the process, the pinion drive apparatus control system 68 associated with the pinion drive apparatus 32 would actuate the pinion drive 32 to rotate the drive pinions (e.g., 24, 28, 40 and 42) in the appropriate directions to move the cartridge access device 12 along the displacement path 14 in the proper direction, i.e., toward the new position 66'. As it is moved or displaced, the cartridge access device 12 is guided along the displacement path 14 by the elongate guide members 50 and 52 provided on the first and second elongate gear racks 20 and 22, respectively. As discussed above, the guide members 50 and 52 control the position of the cartridge access device 12 in the transverse or lateral direction 58 (FIG. 2). The two wheels or rollers 60 and 62 control the position of the cartridge access device 12 in the vertical direction 64. Once the cartridge access device 12 reaches the second position 66' adjacent the cartridge read/write device 48, the control system 68 will deactivate the pinion drive apparatus 32, thereby stopping the motion of the cartridge access device 12.

A significant advantage of the translation apparatus 10 according to the present invention is that it provides a simple and convenient way to move the cartridge access device 12 in a lateral direction (i.e., along the displacement path 14). Since the lateral and vertical guidance is provided by the elongate gear racks (e.g., 20 and 22), they are the only components that need be carefully aligned to provide the proper alignment and positional accuracy to the cartridge access device 12. Indeed, and as will be described in greater detail below, the third and fourth elongate gear racks 36 and 38 are allowed to move or "float" in the transverse or lateral direction 58, since the lateral positioning of the cartridge access device 12 is provided by the guide member portions 50 and 52 provided on the first and second elongate gear racks 20 and 22. Allowing the third and fourth elongate gear racks 36 and 38 to move or "float" in the lateral direction 58 simplifies assembly and allows a considerable "loosening" of the positional tolerances associated with the third and fourth elongate gear racks 36 and 38. Allowing the third and fourth gear racks 36 and 38 to float in the lateral direction 58 also reduces the likelihood that the third and fourth drive pinions 40 and 42 will bind on the respective third and fourth gear racks 36 and 38 as the cartridge access device 12 is moved or translated along the displacement path 14.

Another advantage of the translation apparatus 10 is that the various elongate gear racks (e.g., 20, 22, 26, and 38) may be fabricated from sheet metal, thereby dispensing with the need to fabricate these components from more expensive materials or according to more expensive (e.g., machining) processes.

Still yet another advantage of the translation apparatus 10 is that it is readily expandable in the direction of the displacement path 14. For example, and as will be discussed in greater detail below, the displacement path 14 may be extended in length by simply positioning additional elongate gear racks adjacent the ends of the elongate gear racks 20, 22, 36, and 38, in the manner best seen in FIG. 4. Such an arrangement allows for the convenient expansion of a data storage system that embodies the translation apparatus 10, as described in further detail below.

In the embodiments shown and described herein, the cartridge access device 12 may comprise a cartridge engaging assembly or "picker" (not shown) suitable for loading and retrieving the data cartridges 18 to and from the particular cartridge receiving device (e.g., the cartridge read/write device 48 or the cartridge storage arrays 72) in which the data cartridge 18 may be held. Examples of cartridge engaging assemblies or "pickers" suitable for use in the present invention are disclosed in the following U.S. patents which are specifically incorporated by reference herein for all that they disclose: U.S. Pat. No. 4,998,232 entitled "Optical Disk Handling Apparatus with Flip Latch"; U.S. Pat. No. 5,010,536 entitled "Cartridge Handling System"; U.S. Pat. No. 5,014,255 entitled "Optical Disk Cartridge Handling Apparatus with Passive Cartridge Engagement Assembly"; and U.S. Pat. No. 5,043,962 entitled "Cartridge Handling System". Alternatively, any of a wide range of other types of cartridge engaging assemblies or pickers that are now known or that may be developed in the future may be used in the present invention. In any event, since such cartridge engaging assemblies or "pickers" are well-known in the art and are not necessary in understanding the present invention, the particular cartridge engaging assembly or "picker" that is utilized in one preferred embodiment of the invention will not be described in further detail.

Regardless of the particular type of style of cartridge engaging assembly or "picker" that is utilized in the cartridge access device 12, the cartridge access device 12 may be mounted to at least two elongate gear racks 20 and 22 as follows. The first elongate gear racks 20 may comprise a lower gear rack and may be mounted to the chassis 70 so that it is generally aligned along the displacement path 14. The first or lower elongate gear rack 20 may be provided with a plurality of teeth 26 sized to operatively engage similar teeth 27 provided on the lower drive pinion 24. See FIG. 2. The first or lower elongate gear rack 20 also may be provided with an elongate guide member 50 which, in one preferred embodiment, may take the form of a turned-up edge of the elongate gear rack 20, as is also best seen in FIG. 2. Accordingly, the elongate guide member or portion 50 of the first or lower elongate gear rack 20 may comprise first and second opposed bearing surfaces 78 and 80.

The first or lower elongate gear rack 20 may be mounted to the lower portion of chassis 70 of jukebox data storage system 16 by any of a wide range of fastening systems and devices that are well-known in the art. By way of example, in one preferred embodiment, the lower elongate gear rack 20 may be mounted to the chassis 70 by one or more screws (not shown) that extend through one or more holes 82 provided in the gear rack 20. See FIG. 2. Depending on the particular installation, it may be necessary or desirable to position one or more spacers 84 (FIG. 3) between the gear rack 20 and the chassis 70 to ensure adequate clearance between the lower drive pinion 24 and the chassis 70.

The second or upper elongate gear rack 22 is similar to the first or lower gear rack 20 and may be mounted to the upper portion of chassis 70 so that it also extends along the displacement path 14. See FIG. 3. The second or upper elongate gear rack 22 may also be provided with a plurality of teeth 30 sized to engage similar teeth 31 provided on upper drive pinion 28. The upper elongate gear rack 22 may also be provided with an elongate guide member or portion 52 having opposed bearing surfaces 86 and 88, as best seen in FIG. 3. In the embodiment shown and described herein, the second elongate guide member portion 52 may comprise a down-turned edge portion of the upper gear rack 22. The upper gear rack 22 may be mounted to the upper portion of chassis 70 of the jukebox data storage system 16 by one or more screws (not shown) that extend through one or more holes 82 provided on upper gear rack 22. Alternatively, other types of fastening devices or systems may be used, as would be obvious to persons having ordinary skill in the art after having become familiar with the teachings of the present invention. If necessary to provide clearance for the upper drive pinion 28, the upper gear rack 22 may be spaced apart from the upper portion of chassis 70 by one or more spacers 84 in the manner best seen in FIG. 3.

The first or lower and second or upper elongate gear racks 20 and 22 may be fabricated from any of a wide range of materials (such as metals or plastics) suitable for the intended application. Accordingly, the present invention should not be regarded as limited to gear racks that comprise any particular material. However, by way of example, in one preferred embodiment, both the lower and upper gear racks 20 and 22 are fabricated from sheet metal with the respective guide member portions 50 and 52 thereof comprising up-turned and down-turned edge portions, respectively.

It is generally preferred, but not required, to provide the translation apparatus 10 with third and fourth elongate gear racks 36 and 38 positioned in the manner best seen in FIGS. 1 and 2. The third and fourth gear racks 36 and 38 provide improved positional accuracy along the displacement path 14 by virtue of providing additional drive surfaces (i.e., gear racks) for moving the rear end 90 of cartridge access device 16.

With reference now to FIGS. 2 and 3, the third or lower elongate gear rack 36 may be mounted to the lower portion of chassis 70 of data storage system 16 so that it also extends generally along the displacement path 14. The third elongate gear rack 36 may be provided with a plurality of gear teeth 44 sized to operatively engage teeth 45 provided on lower pinion 40. The third elongate gear rack 36 may be provided with an up-turned edge 92 to provide additional strength and rigidity to the gear rack 36, although such an up-turned edge 92 is not required.

The third elongate gear rack 36 should be mounted to the chassis 70 so that it is constrained in the vertical direction 64 as well as along the displacement path 14, but not in the transverse or lateral direction 58. Such a mounting arrangement may be accomplished by providing the third gear rack 36 with one or more elongate mounting holes or slots 94 through which a corresponding screw (not shown) or other such device may be inserted to secure the gear rack 36 to the chassis 70. The elongate mounting holes or slots 94 allow the gear rack 36 to move or "float" in the lateral direction 58, while at the same time preventing the gear rack 36 from moving in either the vertical direction 64 or horizontally along the displacement path 14. A compressive biasing member 39 such as a spring prevents the gear rack 38 from being disengaged from the drive pinion 42. The biasing member 39 is attached at its other end to the chassis 70. As was the case for the first two gear racks 20 and 22, it may be necessary or desirable to place a spacer 84 between the third elongate gear rack 36 and the chassis 70 to provide sufficient clearance for the third drive pinion 40.

The fourth elongate gear rack 38 may comprise a generally elongate member mounted to the upper portion of chassis 70 so that it also extends generally along the displacement path 14. The upper gear rack 38 may be provided with a plurality of gear teeth 46 sized to operatively engage teeth 47 provided on upper drive pinion 42. It is generally preferred, but not required, that the fourth elongate gear rack 38 be provided with a down-turned edge 96 to provide additional strength and rigidity to the fourth gear rack 38.

As was the case for the third elongate gear rack 36, the fourth elongate gear rack 38 should be mounted to the upper portion of chassis 70 so that it is free to move or "float" in the lateral direction 58. Such a mounting arrangement may be accomplished by providing the fourth gear rack 38 with one or more elongate mounting holes or slots 94 through which a corresponding screw (not shown) or other such device may be inserted to secure the gear rack 38 to the chassis 70. The elongate mounting holes or slots 94 allow the gear rack 38 to move or "float" in the lateral direction 58, while at the same time preventing the gear rack 38 from moving in either the vertical direction 64 or horizontally along the displacement path 14. A compressive biasing member 37 such as a spring prevents the gear rack 36 from being disengaged from the drive pinion 40. The biasing member 39 is attached at its other end to the chassis 70. Finally, it may be necessary or desirable to place a spacer 84 between the fourth elongate gear rack 38 and the chassis 70 to provide sufficient clearance for the fourth drive pinion 42.

The third and fourth elongate gear racks 36 and 38 may be made from any of a wide range of materials, such as metals or plastics, suitable for the intended application. By way of example, in one preferred embodiment, the third and fourth gear racks 36 and 38 are formed from sheet metal.

As was briefly described above, the cartridge access device 12 is caused to move along the displacement path 14 by the engagement of various drive pinions with the elongate gear racks. More specifically, the cartridge access device 12 may be provided with a first or lower pinion gear 24 mounted so that the teeth 27 provided thereon engage the teeth 26 provided on the first or lower gear rack 20. Similarly, a second or upper drive pinion 28 may be mounted to the cartridge access device 12 so that the teeth 31 provided on the second pinion gear 28 engage the teeth 30 provided on the upper gear rack 22. While any of a wide variety of configurations may be used to so mount the first and second drive pinions 24 and 28, in one preferred embodiment, both the lower and upper drive pinions 24 and 28 are mounted to opposite ends of a pinion shaft 98 that is journalled for rotation in a pair of bearing blocks 11 and 13 provided on the cartridge access device 12 so that the pinion shaft 98 is free to rotate about pinion axis 34.

If the translation apparatus 10 is provided with third and fourth elongate gear racks 36 and 38, then the cartridge access device 12 may be provided with third and fourth drive pinons 40 and 42 in the manner best seen in FIGS. 2 and 3. More specifically, the third or lower drive pinion 40 should be mounted to the cartridge access device 12 so that the teeth 45 provided on lower drive pinion 40 engage the teeth 44 provided on the third elongate gear rack 36. The fourth or upper drive pinion 42 may be mounted so that its teeth 47 engage the teeth 46 provided on the fourth elongate gear rack 38. In the embodiment shown and described herein, the third and fourth drive pinions 40 and 42 are mounted to opposite ends of a second pinion shaft 99 that is journalled for rotation in a pair or bearing blocks 15 and 17 provided on the cartridge access device 12 so that the second pinion shaft 99 is free to rotate about a second pinion axis 35.

The pinion drive apparatus 32 may also be mounted to the cartridge access device 12 and may comprise a motor 19 for rotating the various drive pinions 24, 28, 40, and 42 in the appropriate directions to cause the cartridge access device 12 to be moved back and forth along the displacement path 14. Any of a wide range of drive system taking on any of a wide range of configurations may be used to connect the motor 19 to the drive pinions 24, 28, 40, and 42. However, by way of example, in one preferred embodiment, the motor 19 may rotate the second pinion shaft 99 via a worm drive arrangement wherein a worm 21 mounted to the motor shaft (not shown) engages a worm gear 23 mounted to the second pinion shaft 99. The first pinion shaft 98 may be operatively connected to the second pinion shaft 99 by a toothed drive belt 25, although other devices may be used. The toothed drive belt 25 allows both pinion shafts 98 and 99 to rotate together in a synchronized manner.

The pinion drive apparatus 32 may be provided with a rotation sensing system, such as an optical encoder system (not shown), for providing the control system 68 (FIG. 1) with data indicative of the position of the cartridge access device 12 along the displacement path 14. However, since such position sensing systems are well-known in the art and could be easily provided by persons having ordinary skill in the art after having become familiar with the teachings of the present invention, the particular position sensing system utilized in one preferred embodiment of the invention will not be discussed in further detail herein.

As was briefly mentioned above, the pinion drive apparatus 32 may also comprise a control system 68 for actuating the motor 19. The control system 68 may also be responsive to position data signals produced by the position sensing system (not shown) so as to operate the motor 19 in the appropriate rotational direction and for the appropriate period of time to move the cartridge access device 12 to the desired location. However, since such control systems are well-known in the art and could be readily provided by persons having ordinary skill in the art after having become familiar with the present invention, the particular control system 68 that may be utilized in one preferred embodiment of the present invention will not be described in further detail herein.

With reference now primarily to FIG. 3, the cartridge access device 12 is guided primarily by the first and second elongate gear racks 20 and 22. More specifically, the cartridge access device 12 may be provided with a first or lower U-shaped bearing member 54 sized to slidably engage the opposed surfaces 78 and 80 (FIG. 2) of the elongate guide member or portion 50 provided on the first elongate gear rack 20. The cartridge access device 12 may also be provided with a second or upper U-shaped bearing member 56 sized to slidably engage the opposed surfaces 86 and 88 of the elongate guide member or portion 52 provided on the upper gear rack 22. The engagement of the lower and upper U-shaped bearing members 54 and 56 with the respective guide member portions 50 and 52 restrains the cartridge access device 12 in the transverse or lateral direction 58, yet allows the cartridge access device 12 to move freely along the displacement path 14.

The U-shaped bearing members 54 and 56 may be comprise any of a wide range of materials, such as metals or plastics, suitable for providing a low friction engagement with the elongate guide members or portions 50 and 52 provided on the respective elongate gear racks 20 and 22. By way of example, in one preferred embodiment, the U-shaped bearing members 54 and 56 may be made from polycarbonate with 5% Teflon, although other materials may also be used.

It should be noted that the present invention is not limited to the sliding type bearings 54 and 56 shown and described herein, but could instead utilize roller type bearings (not shown), as would be obvious to persons having ordinary skill in the art. Such roller type bearings may comprise a plurality of rollers or wheels (not shown) positioned to engage the opposed bearing surfaces of the elongate guide members or portions 50 and 52. However, since such roller type bearings are well-known in the art and could be easily provided by persons having ordinary skill in the art after having become familiar with the teachings of the present invention, the roller type bearings that may be used in an alternative embodiment will not be discussed in further detail herein.

Still referring to FIG. 3, vertical support for the cartridge access device 12 may be provided by a pair of rollers or wheels 60 and 62 which may be mounted for rotation on the lower portion of the cartridge access device 12. More specifically, the first roller 60 may be positioned so that it rolls along the first gear rack 20. Similarly, the second roller 62 may be positioned so that it rolls along the third gear rack 36, if one is provided. Alternatively, the second roller 62 could be positioned so that it rolls directly on the lower portion of chassis 70 of the jukebox data storage system 16. In an alternative arrangement, the wheels 60 and 62 may be replaced with simple sliding bearings, as would be obvious to persons having ordinary skill in the art.

The combination of the U-shaped bearings 54, 56, and wheels 60, 62 provides full support to the cartridge access device 12 allowing it to be easily moved back and forth along the displacement path 14, while at the same time providing accurate positioning along the transverse or lateral direction 58 as well as the vertical direction 64. Since the lateral positioning is provided by the engagement of the U-shaped bearings 54 and 56 with the guide members 50 and 52 provided on the first and second gear racks 20 and 22, it is only necessary to accurately position and align the first two gear racks 20 and 22 with respect to the various cartridge receiving devices contained within the data storage system 16. Indeed, it is preferred that the third and fourth elongate gear racks 36 and 38, if provided, be allowed to float or move in the lateral direction 58 to reduce or eliminate the chances for binding to occur between the drive pinions 40 and 42 and their respective gear racks 36 and 38.

As was briefly described above, the translation apparatus 10 may be easily expanded to provide a displacement path 14 having an increased length. With reference now to FIG. 4, a laterally expandable modular data storage system 116 is shown with an expanded translation apparatus 110. The modular data storage system 116 may comprise a first modular unit 155 which basically comprises all of the components described above with reference to the jukebox data storage system 16 shown in FIG. 1. The modular data storage system 116 may further comprise a second modular unit having one or more additional cartridge storage arrays 172' for storing additional data cartridges 118. The second modular unit 157 may also be provided with an additional cartridge read/write device 148', although one is not required. The cartridge access device 112 may be moved back and forth along an extended displacement path 114 to allow the cartridge access device 112 to access the data cartridges 118 contained in the additional cartridge storage array 172' and the cartridge read/write device 148'.

The ability to move the cartridge access device 112 along the extended displacement path 114 may be accomplished by adding additional gear rack assemblies (e.g., 122', 136', and 138') within the second modular unit 157 which are substantially in alignment with and adjacent to the existing gear rack assemblies 122, 136, and 138 of the first modular unit 155. An additional lower gear rack (not shown) may be positioned within the second modular unit 157 adjacent the first or lower gear rack (e.g., 20, FIG. 1) of the first modular unit 155. Accordingly, the cartridge access device 112 may be easily translated to the laterally adjacent second modular unit 157 as the various drive pinions will continue along the additional gear racks 122', 136', and 138'.

Figure 4:
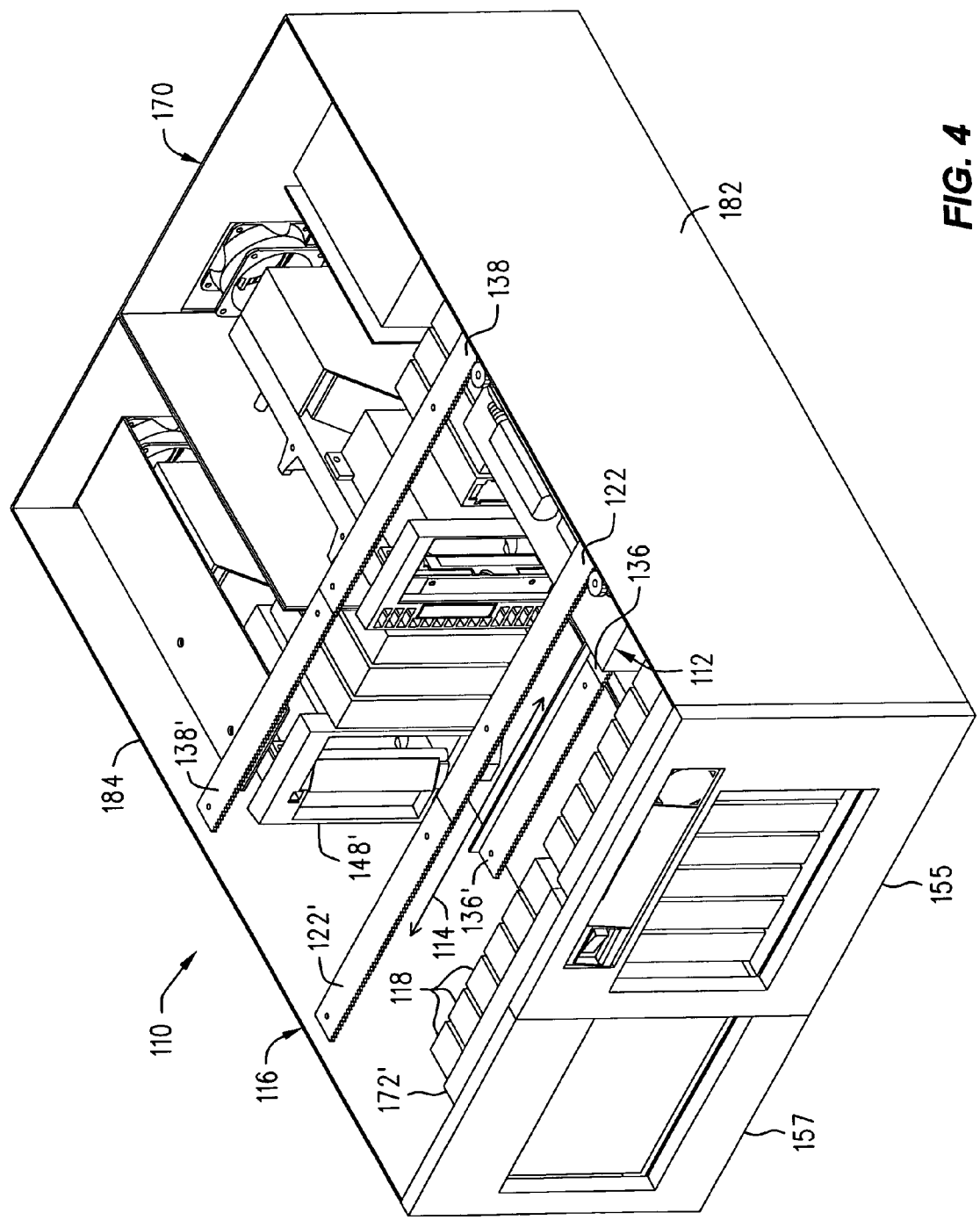
FIG. 4 is a perspective view of one embodiment of the laterally expandable modular data storage system of the present invention.

While two laterally adjacent modular units 155, 157 are shown in FIG. 4, it is to be understood that as many modular units as a customer desires may be utilized in a modular data storage system. Furthermore, one or more modular units may be added to the modular data storage system at any time. To accommodate further modular units, the sidewalls 182, 184 of the chassis 170, or alternatively the entire chassis 170, may be removed and/or repositioned as necessary.

Figure 5:
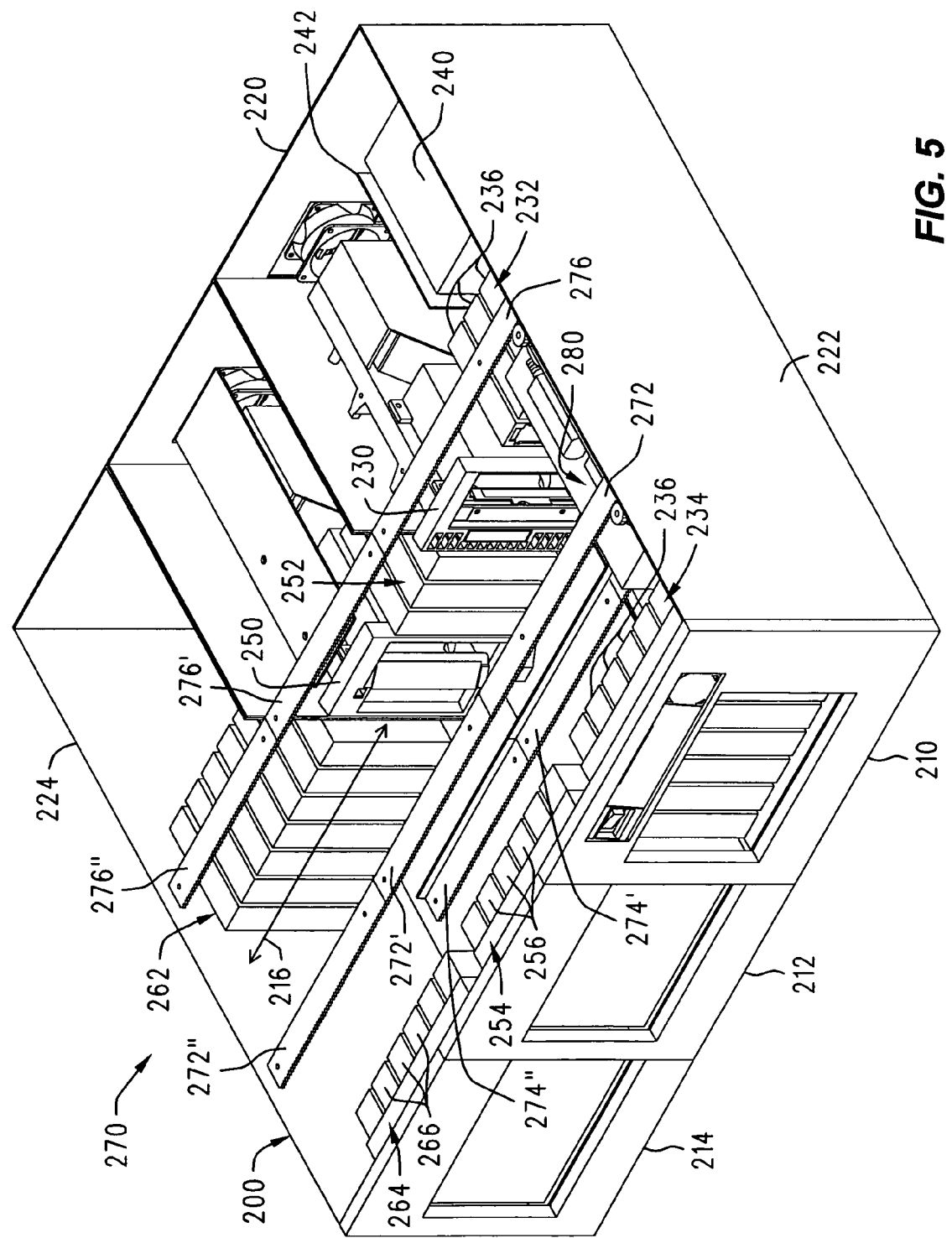
FIG. 5 is a perspective view of another embodiment of the laterally expandable modular data storage system of the present invention.

In another embodiment of the invention shown in FIG. 5, a laterally expandable modular data storage system 200 may comprise a configuration of laterally adjacent "master" modular unit(s) and "slave" modular unit(s). FIG. 5 illustrates a master modular unit 210, a first laterally adjacent slave modular unit 212, and a second laterally adjacent modular unit 214. It is to be understood that any number of master and slave modular units may be utilized within a system 200, but the size of the system may be limited by the length of connecting cables (not shown). Furthermore, the modular units may be arranged in any lateral configuration so long as the modular units are laterally adjacent to one another. For example, a first sidewall 222 adjacent to the master modular unit 210, or alternatively the entire chassis 220, may be removed and/or repositioned in order to attach another slave modular unit (not shown) to the master modular unit 210. Similarly, a second sidewall 224 adjacent to the second modular unit 214, or alternatively the entire chassis 220, may also be removed and/or repositioned in order to attach another slave modular unit (not shown).

As shown in FIG. 5, the master modular unit 210 may comprise a cartridge read-write device 230, a first cartridge storage rack 232 and a second cartridge storage rack 234 having a plurality of cartridge storage locations 236. The read-write device 230 may be electrically connected via a cable (not shown) or the like to a power supply 240. The master modular unit 210 may also house various ancillary devices such as the pinion drive apparatus control system 242 described above with reference to FIGS. 1 and 2, and any other electronic control and data processing systems (not shown) of the type commonly associated with jukebox data storage systems. Alternately, one or more of these ancillary devices may be housed within one or more of the slave modular units.

The first slave modular unit 212 may comprise a cartridge read/write device 250, a third cartridge storage rack 252 and a fourth cartridge storage rack 254 having a plurality of cartridge storage locations 256. The read/write device 250 and any other components (not shown) which require power may be electrically connected via a cable or the like (not shown) to the power supply 240 in the master modular unit. In large systems with several slave modular units, the power supply 240 is preferably centrally located, or, alternatively, several power supplies may be utilized for the system.

The second slave modular unit 214 may comprise a fifth cartridge storage rack 260 and a sixth cartridge storage rack 262 having a plurality of cartridge storage locations 264.

While a particular configuration is shown in FIG. 5, it is to be understood that the master modular unit and each of the slave modular units may be configured in any manner with any combination of cartridge receiving devices, i.e., read/write devices and cartridge storage racks, and other components of a juke box data storage system as described above.

The modular data storage system 200 of FIG. 5 may comprise a translation apparatus 270 which may be identical to the translation apparatus (10, 110) described above relative to FIGS. 1-4, and a cartridge access device 280 which may be identical to the cartridge access device (12, 112) described above. The elongate gear rack assemblies (e.g., 272, 274, 276) within the master modular unit 210 are substantially in alignment with and adjacent to the elongate gear rack assemblies (e.g., 272', 274', 276') in the first slave modular unit 212, which are substantially in alignment with and adjacent to the elongate gear rack assemblies (e.g., 272", 274", 276") in the second slave modular unit 214. All of the gear rack assemblies are aligned along a displacement path 216. Accordingly, the cartridge access device 280 may be easily translated among the master modular unit 210, the laterally adjacent first slave modular unit 212, and the laterally adjacent second slave modular unit 214.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. A modular data storage system for handling and storing data cartridges, comprising:
   a) a cartridge access device;
   b) at least two laterally adjacent modular units, each of said modular units comprising:
      i) a plurality of cartridge receiving devices;
      ii) a first elongate gear rack having first and second ends and aligned along a displacement path;
      iii) a first elongate guide member integral with said first elongate gear rack and extending along the displacement path substantially between the first and second ends of said first elongate gear rack;
      iv) a first bearing mounted to the cartridge access device, said first bearing engaging said first elongate guide member, wherein said first elongate guide member comprises first and second opposed bearing surfaces and wherein said first bearing mounted to the cartridge access device slidably engages the first and second opposed bearing surfaces of said first elongate guide member;
      v) a second elongate gear rack aligned along said displacement path and positioned in spaced-apart relation to said first elongate sear rack; and
      vi) wherein the first elongate gear racks of said laterally adjacent modular units are substantially in alignment with one another, and the second elongate gear racks of said laterally adjacent modular units are substantially in alignment with one another, such that said cartridge access device may be translated among said laterally adjacent modular units;

c) a translation apparatus for moving a cartridge access device along a displacement path, comprising:
   i) a first drive pinion mounted to the cartridge access device, said first drive pinion engaging said first elongate gear rack;
   ii) a second drive pinion mounted to the cartridge access device, said second drive pinion engaging said second elongate gear rack; and
   iii) a pinion drive apparatus operatively associated with said first and second drive pinions, said pinion drive apparatus rotating said first and second drive pinions to move the cartridge access device among the first and second elongate gear racks of said laterally adjacent modular units.

2. The modular data storage system of claim 1, wherein said second elongate gear rack includes a second elongate guide member that extends along the displacement path substantially between the first and second ends of said second elongate gear rack and wherein said translation apparatus further comprises a second bearing mounted to the cartridge access device, said second bearing engaging said second elongate guide member.

3. The modular data storage system of claim 2, wherein said second elongate guide member comprises first and second opposed bearing surfaces and wherein said second bearing mounted to the cartridge access device slidably engages the first and second opposed bearing surfaces of said second elongate guide member.

4. The modular data storage system of claim 3, further comprising a third bearing mounted to the cartridge access device, said third bearing contacting said first elongate gear rack and allowing the cartridge access device to move along the displacement path.

5. The modular data storage system of claim 4, wherein said third bearing comprises a wheel.

6. A modular data storage system for handling and storing data cartridges, comprising:
   a) a cartridge access device;
   b) at least two laterally adjacent modular units, each of said modular units comprising:
      i) a plurality of cartridge receiving devices;
      ii) a first elongate gear rack aligned along a displacement path;
      iii) a second elongate gear rack aligned along said displacement path and positioned in spaced-apart relation to said first elongate gear rack;
      iv) wherein the first elongate gear racks of said laterally adjacent modular units are substantially in alignment with one another, and the second elongate gear racks of said laterally adjacent modular units are substantially in alignment with one another, such that said cartridge access device may be translated among said laterally adjacent modular units;
      v) a third elongate gear rack positioned in generally parallel, spaced-apart relation to said first elongate gear rack;
      vi) a fourth elongate gear rack positioned in generally parallel, spaced-apart relation to said second elongate gear rack so that said first, second, third, and fourth elongate gear racks define a generally rectangular, parallelopiped configuration with said first and third elongate gear racks defining a bottom side of the generally rectangular, parallelopiped configuration and said second and fourth elongate gear racks defining a top side of the generally rectangular, parallelopiped configuration; and
      vii) wherein the third elongate gear racks of said laterally adjacent modular units are substantially in alignment with one another, and the fourth elongate gear racks of said laterally adjacent modular units are substantially in alignment with one another, such that said cartridge access device may be translated among said laterally adjacent modular units;
   c) a translation apparatus for moving a cartridge access device along a displacement path, comprising:
      i) a first drive pinion mounted to the cartridge access device, said first drive pinion engaging said first elongate gear rack;
      ii) a second drive pinion mounted to the cartridge access device, said second drive pinion engaging said second elongate gear rack; and
      iii) a pinion drive apparatus operatively associated with said first and second drive pinions, said pinion drive apparatus rotating said first and second drive pinions to move the cartridge access device among the first and second elongate gear racks of said laterally adjacent modular units.

7. The modular data storage system of claim 6, further comprising:
   a) a third drive pinion mounted to the cartridge access device and operatively associated with said pinion drive apparatus, said third drive pinion engaging said third elongate gear rack; and
   b) a fourth drive pinion mounted to the cartridge access device and operatively associated with said pinion drive apparatus, said fourth drive pinion engaging said fourth elongate gear rack.

8. A modular data storage system for handling and storing data cartridges, comprising:
   a) a cartridge access device;
   b) at least two laterally adjacent modular units, each of said modular units comprising:
      i) a plurality of cartridge receiving devices;
      ii) a first elongate gear rack having first and second ends and aligned along a displacement path;
      iii) a first elongate guide member integral with said first elongate gear rack and extending along the displacement path substantially between the first and second ends of said first elongate gear rack;
      iv) a first bearing mounted to the cartridge access device, said first bearing engaging said first elongate guide member;
      v) a second elongate gear rack aligned along said displacement path and positioned in spaced-apart relation to said first elongate gear rack; and
      vi) wherein the first elongate gear racks of said laterally adjacent modular units are substantially in alignment with one another, and the second elongate gear racks of said laterally adjacent modular units are substantially in alignment with one another, such that said cartridge access device may be translated among said laterally adjacent modular units;
   c) a translation apparatus for moving a cartridge access device along a displacement path, comprising:
      i) a first drive pinion mounted to the cartridge access device, said first drive pinion engaging said first elongate gear rack;
      ii) a second drive pinion mounted to the cartridge access device, said second drive pinion engaging said second elongate gear rack; and
      iii) a pinion drive apparatus operatively associated with said first and second drive pinions, said pinion drive apparatus rotating said first and second drive pinions to move the cartridge access device among the first and second elongate gear racks of said laterally adjacent modular units, wherein said pinion drive apparatus comprises:
  a) a motor having a shaft;
  b) a worm attached to the shaft of said motor; and
  c) a worm gear operatively connected to said first and second drive pinions, said worm gear mounted to engage said worm mounted to the shaft of said motor.

9. A modular data storage system for handling and storing data cartridges, comprising:
  a) a cartridge access device;
  a) a master modular unit and at least one slave modular unit, each of said modular units being positioned adjacent one another to form laterally adjacent modular units, each of said modular units comprising:
    i) a plurality of cartridge receiving devices;
    ii) a first elongate gear rack having first and second ends and aligned along a displacement path;
    iii) a first elongate guide member integral with said first elongate gear rack and extending along the displacement path substantially between the first and second ends of said first elongate gear rack;
    iv) a first bearing mounted to the cartridge access device, said first bearing engaging said first elongate guide member;
    v) a second elongate gear rack aligned along said displacement path and positioned in spaced-apart relation to said first elongate gear rack; and
    vi) wherein the first elongate gear racks of said laterally adjacent modular units are substantially in alignment with one another, and the second elongate gear racks of said laterally adjacent modular units are substantially in alignment with one another, such that said cartridge access device may be translated among said laterally adjacent modular units;
  c) a translation apparatus for moving a cartridge access device along a displacement path, comprising:
    i) a first drive pinion mounted to the cartridge access device, said first drive pinion engaging said first elongate gear rack;
    ii) a second drive pinion mounted to the cartridge access device, said second drive pinion engaging said second elongate gear rack; and
    iii) a pinion drive apparatus operatively associated with said first and second drive pinions, said pinion drive apparatus rotating said first and second drive pinions to move the cartridge access device among the first and second elongate gear racks of said laterally adjacent modular units;
  d) said master modular unit further comprising a power supply, wherein each of said slave modular units which require electrical power is electrically connected to said power supply in said master modular unit.

10. A modular data storage system for handling and storing data cartridges, comprising:
  a) a cartridge access device;
  b) a master modular unit and at least one slave modular unit, each of said modular units being positioned adjacent one another to form laterally adjacent modular units, each of said modular units comprising:
    i) a plurality of cartridge receiving devices;
    ii) a first elongate gear rack having first and second ends and aligned along a displacement path;
    iii) a first elongate guide member integral with said first elongate gear rack and extending along the displacement path substantially between the first and second ends of said first elongate gear rack;
    iv) a first bearing mounted to the cartridge access device, said first bearing engaging said first elongate guide member, wherein said first elongate guide member comprises first and second opposed bearing surfaces and wherein said first bearing mounted to the cartridge access device slidably engages the first and second opposed bearing surfaces of said first elongate guide member;
    v) a second elongate gear rack aligned along said displacement path and positioned in spaced-apart relation to said first elongate gear rack; and
    vi) wherein the first elongate gear racks of said laterally adjacent modular units are substantially in alignment with one another, and the second elongate gear racks of said laterally adjacent modular units are substantially in alignment with one another, such that said cartridge access device may be translated among said laterally adjacent modular units;
  c) a translation apparatus for moving a cartridge access device along a displacement path, comprising:
    i) a first drive pinion mounted to the cartridge access device, said first drive pinion engaging said first elongate gear rack;
    ii) a second drive pinion mounted to the cartridge access device, said second drive pinion engaging said second elongate gear rack; and
    iii) a pinion drive apparatus operatively associated with said first and second drive pinions, said pinion drive apparatus rotating said first and second drive pinions to move the cartridge access device among the first and second elongate gear racks of said laterally adjacent modular units;
  ) said master modular unit further comprising a power supply.

11. The modular data storage system of claim 10, wherein said second elongate gear rack includes a second elongate guide member that extends along the displacement path substantially between the first and second ends of said second elongate gear rack and wherein said translation apparatus further comprises a second bearing mounted to the cartridge access device, said second bearing engaging said second elongate guide member.

12. The modular data storage system of claim 11, wherein said second elongate guide member comprises first and second opposed bearing surfaces and wherein said second bearing mounted to the cartridge access device slidably engages the first and second opposed bearing surfaces of said second elongate guide member.

13. The modular data storage system of claim 12, further comprising a third bearing mounted to the cartridge access device, said third bearing contacting said first elongate gear rack and allowing the cartridge access device to move along the displacement path.

14. The modular data storage system of claim 13, wherein said third bearing comprises a wheel.

15. A modular data storage system for handling and storing data cartridges, comprising:
  a) a cartridge access device;
  b) a master modular unit and at least one slave modular unit, each of said modular units being positioned adjacent one another to form laterally adjacent modular units, each of said modular units comprising:
    i) a plurality of cartridge receiving devices;
    ii) a first elongate gear rack having first and second ends and aligned along a displacement path;

iii) a first elongate guide member integral with said first elongate gear rack and extending along the displacement path substantially between the first and second ends of said first elongate gear rack;
iv) a first bearing mounted to the cartridge access device, said first bearing engaging said first elongate guide member;
v) a second elongate gear rack aligned along said displacement path and positioned in spaced-apart relation to said first elongate gear rack;
vi) wherein the first elongate gear racks of said laterally adjacent modular units are substantially in alignment with one another, and the second elongate gear racks of said laterally adjacent modular units are substantially in alignment with one another, such that said cartridge access device may be translated among said laterally adjacent modular units;
vii) a third elongate gear rack positioned in generally parallel, spaced-apart relation to said first elongate gear rack;
viii) a fourth elongate gear rack positioned in generally parallel, spaced-apart relation to said second elongate gear rack so that said first, second, third, and fourth elongate gear racks define a generally rectangular, parallelopiped configuration with said first and third elongate gear racks defining a bottom side of the generally rectangular, parallelopiped configuration and said second and fourth elongate gear racks defining a top side of the generally rectangular, parallelopiped configuration; and
ix) wherein the third elongate gear racks of said laterally adjacent modular units are substantially in alignment with one another, and the fourth elongate gear racks of said laterally adjacent modular units are substantially in alignment with one another, such that said cartridge access device may be translated among said laterally adjacent modular units;
c) a translation apparatus for moving a cartridge access device alone a displacement path, comprising:
i) a first drive pinion mounted to the cartridge access device, said first drive pinion engaging said first elongate gear rack;
ii) a second drive pinion mounted to the cartridge access device, said second drive pinion engaging said second elongate gear rack; and
iii) a pinion drive apparatus operatively associated with said first and second drive pinions, said pinion drive apparatus rotating said first and second drive pinions to move the cartridge access device among the first and second elongate gear racks of said laterally adjacent modular units;
d) said master modular unit further comprising a power supply.

16. The modular data storage system of claim 15, said translation apparatus further comprising:
a) a third drive pinion mounted to the cartridge access device and operatively associated with said pinion drive apparatus, said third drive pinion engaging said third elongate gear rack; and
b) a fourth drive pinion mounted to the cartridge access device and operatively associated with said pinion drive apparatus, said fourth drive pinion engaging said fourth elongate gear rack.

17. A modular data storage system for handling and storing data cartridges, comprising:
a) a cartridge access device;
b) a master modular unit and at least one slave modular unit, each of said modular units being positioned adjacent one another to form laterally adjacent modular units, each of said modular units comprising:
i) a plurality of cartridge receiving devices;
ii) a first elongate gear rack having first and second ends and aligned along a displacement path;
iii) a first elongate guide member integral with said first elongate gear rack and extending along the displacement path substantially between the first and second ends of said first elongate gear rack;
iv) a first bearing mounted to the cartridge access device, said first bearing engaging said first elongate guide member;
v) a second elongate gear rack aligned along said displacement path and positioned in spaced-apart relation to said first elongate gear rack; and
vi) wherein the first elongate gear racks of said laterally adjacent modular units are substantially in alignment with one another, and the second elongate gear racks of said laterally adjacent modular units are substantially in alignment with one another, such that said cartridge access device may be translated among said laterally adjacent modular units;
c) a translation apparatus for moving a cartridge access device along a displacement path, comprising:
i) a first drive pinion mounted to the cartridge access device, said first drive pinion engaging said first elongate gear rack;
ii) a second drive pinion mounted to the cartridge access device, said second drive pinion engaging said second elongate gear rack; and
iii) a pinion drive apparatus operatively associated with said first and second drive pinions, said pinion drive apparatus rotating said first and second drive pinions to move the cartridge access device among the first and second elongate gear racks of said laterally adjacent modular units, wherein said pinion drive apparatus comprises:
a) a motor having a shaft;
b) a worm attached to the shaft of said motor; and
c) a worm gear operatively connected to said first and second drive pinions, said worm gear mounted to engage said worm mounted to the shaft of said motor; and
d) said master modular unit further comprising a power supply.

* * * * *

UNITED STATES PATENT AND TRADEMARK OFFICE
CERTIFICATE OF CORRECTION

PATENT NO. : 7,451,461 B1
APPLICATION NO. : 09/371708
DATED : November 11, 2008
INVENTOR(S) : Robert W Luffel et al.

It is certified that error appears in the above-identified patent and that said Letters Patent is hereby corrected as shown below:

In column 12, line 60, in Claim 1, delete "sear" and insert -- gear --, therefor.

In column 15, line 13, in Claim 9, delete "a) a" and insert -- b) a --, therefor.

In column 16, line 35, in Claim 10, delete ") said" and insert -- d) said --, therefor.

In column 17, line 39, in Claim 15, delete "alone" and insert -- along --, therefor.

Signed and Sealed this

Thirty-first Day of August, 2010

David J. Kappos
*Director of the United States Patent and Trademark Office*